United States Patent [19]

Roberts

[11] Patent Number: 4,701,010
[45] Date of Patent: Oct. 20, 1987

[54] UNITARY BODY OPTICAL COUPLER

[75] Inventor: Harold Roberts, Westboro, Mass.

[73] Assignee: ADC Fiber Optics Corporation, Westboro, Mass.

[21] Appl. No.: 646,004

[22] Filed: Aug. 30, 1984

[51] Int. Cl.⁴ .......................... G02B 6/26; G02B 6/42
[52] U.S. Cl. ............................................. 350/96.15
[58] Field of Search .............. 350/96.15, 96.16, 96.17

[56] References Cited

U.S. PATENT DOCUMENTS

| | | | |
|---|---|---|---|
| 3,653,739 | 4/1972 | Strack | 350/96.32 |
| 4,211,469 | 7/1980 | Holzman | 350/96.18 |
| 4,274,705 | 6/1981 | Miller | 350/96.15 |
| 4,307,933 | 12/1981 | Palmer et al. | 350/96.15 |
| 4,422,714 | 12/1983 | Benoit et al. | 350/96.15 |
| 4,423,922 | 1/1984 | Porter | 350/96.15 |
| 4,511,207 | 4/1985 | Newton et al. | 350/96.15 |
| 4,515,431 | 5/1985 | Shaw et al. | 350/96.15 |
| 4,536,058 | 8/1985 | Shaw et al. | 350/96.15 |
| 4,621,895 | 11/1986 | Motske | 350/96.15 |
| 4,626,065 | 12/1986 | Mori | 350/96.15 |

*Primary Examiner*—Robert E. Wise
*Attorney, Agent, or Firm*—Weingarten, Schurgin, Gagnebin & Hayes

[57] ABSTRACT

A fiber optic coupler easily molded as an optically transparent body and adapted to provide bidirectional transmission, multiplexing, demultiplexing, fail safe relaying, or other functions from a single coupler. The body may be molded without side actions for simplicity and accuracy of placement of critical surfaces. The body includes first and second cavities for positioning light sources, such as a solid state emitter or fiber termination, and third and fourth cavities for positioning a light receiver, such as a solid state detector or fiber in a fiber connector. Opposite each source and receiver cavity is located a reflector cavity terminating in a reflecting face formed by the air-coupler body interface and operating by total internal reflection. A slot extends into the body to position a filter such as a dichroic mirror or beam splitter between the cavities. The filter, source and receiver cavities, and reflecting faces are positioned to provide light paths from one or both sources, reflected by the associated reflective face, and passing through or reflecting off the filter. The transmitted or reflected light is then reflected off one or both of the remaining reflective faces to one or both of the receiver cavities. The reflective faces may spherical, aspheric concave, ellipsoidal, paraboloidal or flat.

17 Claims, 12 Drawing Figures

UNITARY BODY OPTICAL COUPLER

FIELD AND BACKGROUND OF THE INVENTION

Fiber optic couplers are multiport devices used between fibers or between fibers and solid state detectors and emitters. Applications which use such couplers include multiplexers for combining plural wavelengths into a single fiber and demultiplexers for separating plural wavelengths in a single fiber into distinct fibers or detectors. Couplers are also used for bidirectional coupling between a fiber and a respective detector and emitter.

In all these applications couplers are required which minimize losses, are relatively inexpensive to produce and can be used in the field with success. To insure that losses are minimized, great accuracy is required in the placement of fiber terminations, detectors and emitters and the focus of light paths through the coupler between these elements. Owing to the need for high accuracy in coupler positioning and the complexity of the coupler functions, low cost production is difficult to achieve. Molds for efficient mass production may require side actions which increases cost, slows production and impedes accuracy in the overall coupler element placement. Field utilization of such couplers requires that they be made to be used by lesser trained personnel while avoiding the opportunity for misalignment of the fibers, detectors and emitters that are used with the coupler.

In repeater functions, the light in a fiber is periodically amplified. For this purpose, a fiber is connected to a detector to sense the light signal in the fiber and, after amplification, the light is applied to a further length of fiber through an emitter and connector. Any failure of this system will terminate the transmission of all light along the fiber, causing a complete loss of all signal on the fiber path from that point on.

SUMMARY OF THE INVENTION

A coupler according to the present invention accomplishes the goals of low loss and mass production at low cost and is readily usable in the field. The fiber optic coupler is an optically transparent body formed by molding without side actions. The coupler is adapted to provide bidirectional transmission, multiplexing, demultiplexing, and fail safe repeating or other functions from a single, unitary component. The coupler body includes first and second cavities for positioning light sources, which can include a solid state emitter or fiber in a connector, and third and fourth cavities for positioning a light receiver, which can include a solid state detector or fiber in a connector. Opposite each source and receiver cavity is located a reflector cavity terminating in a reflecting face formed by the interface with the coupler body and operating by total internal reflection. A slot extends into the body to position a filter such as a dichroic mirror or beam splitter betwen the cavities. The cavities are precision molded to precisely locate the sources and receivers. The filter, sources, receivers and reflecting faces are positioned to provide light paths from one or both sources, reflected by the associated reflective face, and passing through or reflecting off the filter. The transmitted or reflected light is reflected off one or both of the remaining reflective faces to one or both of the receivers. The reflective faces which may be of diverse shapes operate by total internal reflection. In the case of an ellipsoidal face, an intermediate focus is produced at the filter, while with a paraboloidal face collimated light is directed through the filter. Spherical, flat or other aspheric concave faces are possible.

To avoid the possibility of polarized reflections, the angle of incidence of the coupler light with the filter is preferably within twenty degrees to the normal to the filter face.

DESCRIPTION OF THE DRAWING

These and other features of the present invention are more fully set forth below in the solely exemplary detailed description and accompanying drawing of which.

DETAILED DESCRIPTION

The present invention contemplates a coupler for fiber optic applications formed in a single body of transparent material using molds without side actions and capable of low loss coupling for bidirectional, multiplex, demultiplex, fail safe relay and other applications. Such a coupler is illustrated generally in a preferred form in FIGS. 1–6. As shown there, a coupler body 12 is formed of a transparent optical material. For this purpose a moldable plastic such as a polycarbonate or acrylic may be used, other plastics being also usable. A slot 14 (FIGS. 3–5) is set through the body 12 in a central location between recesses 15 and is adapted to receive and hold centrally within it a filter 16, such as a dichroic mirror or beam splitter, the function of which will be described below.

Figure 1:
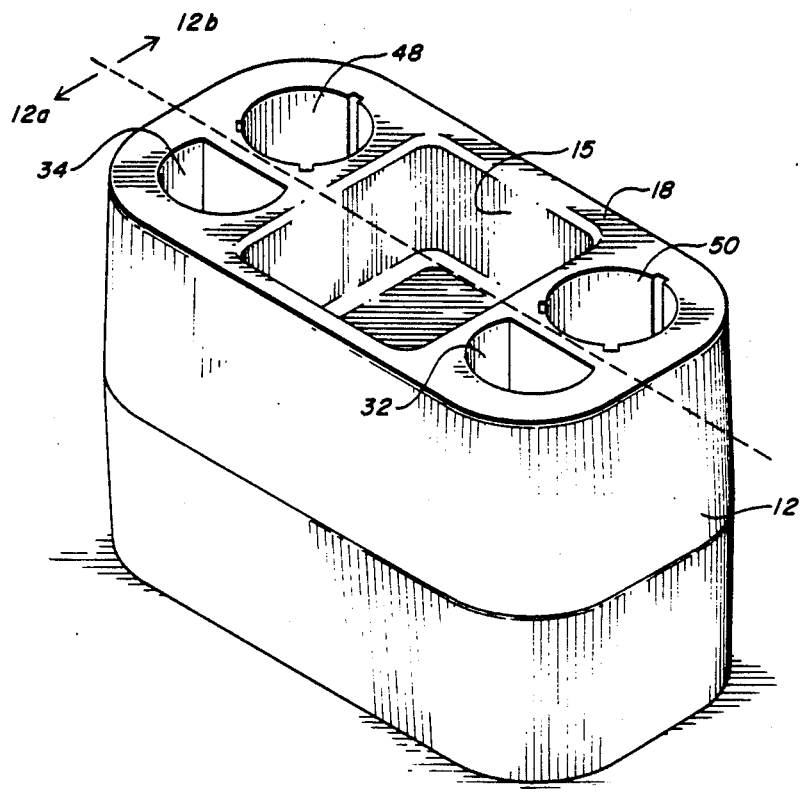
FIG. 1 is a perspective view of a first embodiment of a coupler according to the invention.
Figure 2:
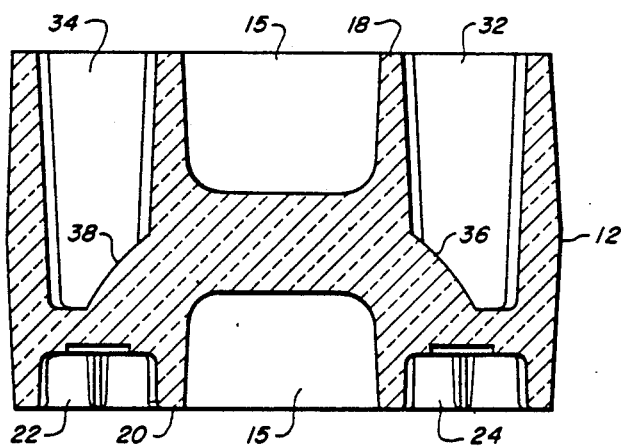
FIGS. 2 and 3 are sectional views of the coupler of FIG. 2.
Figure 3:
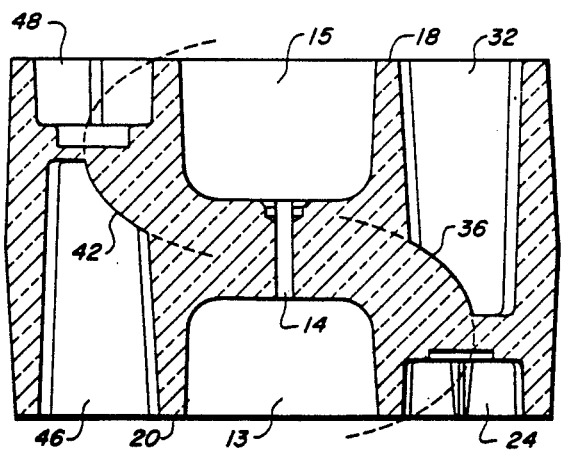
Figure 4:
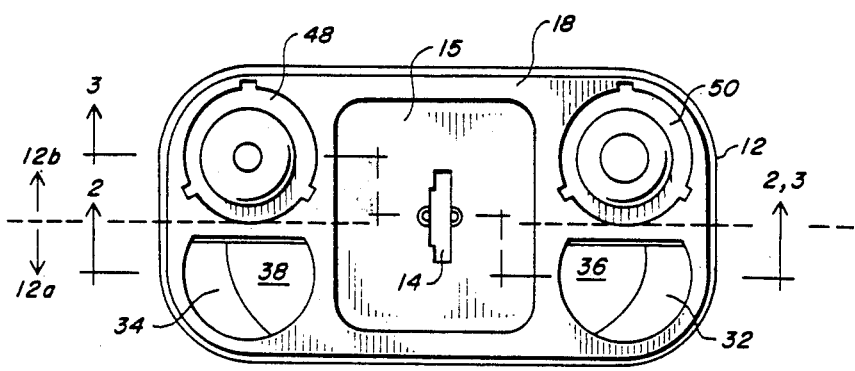
FIGS. 4 and 5 are respective top and bottom views of the coupler of FIG. 2.
Figure 5:
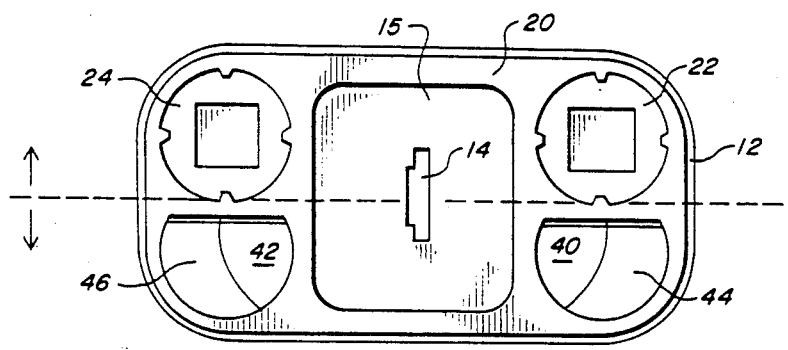

The body 12 can be viewed as having a top surface 18 and a bottom surace 20. All cavities or apertures, such as the channel 14, are formed through one or both of the opposite surfaces 18 and 20 facilitating the molding of the coupler without the use of side actions in the mold. The coupler body can be further viewed as having a front half 12a and rear half 12b (FIGS. 1, 4 and 5). Through the front half of the bottom surface 20 are formed two cavities 22 and 24 at opposite ends of the surface 20 (FIGS. 2, 3, 5 and 6). The cavities 22 and 24 are shown formed to accept a solid state detector or emitter "TO" package, but may be configured with a connector adapter to accept an optical fiber connector depending upon the application as will be described below. The cavities 22 and 24 are precision formed so as to exactly locate an emitter or detector semiconductor element or fiber connector. Where large area detectors are used, less accuracy can be accommodated. Where a TO package is used for the case of a detector or emitter, the walls of the cavity form a precision fit that guides the semiconductor element to its exact, desired position.

Figure 6:
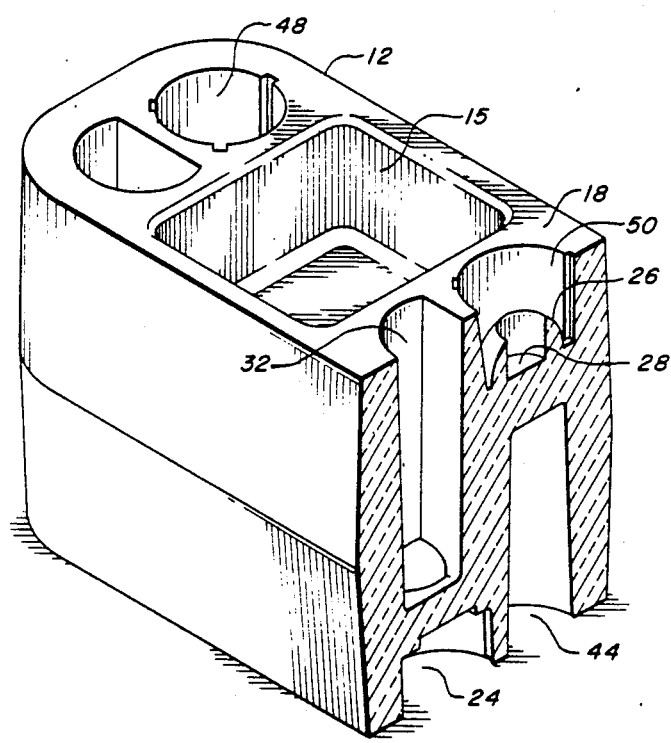
FIG. 6 is a sectional perspective view corresponding to FIG. 2.

In the case of a fiber connector, the cavity can be as shown in FIG. 6 having, for a cavity 50, a spherical shaped reference surface 26 against which a fiber connector is aligned, locating the end of the glass fiber against a face 28 at a precisely centered spot. The fiber connector can be spring loaded in place, or threaded onto a threaded adapter portion, which can be fastened in the cavity.

Further cavities 32 and 34 are formed through the top surface 18, substantially above the cavities 22 and 24 (FIGS. 1–4 and 6). The cavities 32 and 34 terminate in total internal reflecting faces 36 and 38 (FIGS. 2–4) respectively which are placed to provide a reflected path for radiation between the filter 16 and the semiconductor elements, or fiber terminations, in the cavities 22 and 24. The faces 36 and 38 may be ellipsoidal, paraboloidal, aspherical, concave, spherical or flat. The ellipsoidal configuration focuses radiation to a point at the filter 16 while the paraboloidal version directs a collimated beam at the filter 16.

The coupler is completed by a complementary set of cavities in the rear half 12b of the body 12. Preferably cavities of like function in the rear half are formed through opposite surfaces from the cavities of the same function in the front half. As shown, reflecting faces 40 and 42 are placed on terminations of cavities 44 and 46 that are formed through the bottom surface 20 (FIGS. 3, 5 and 6). Cavities 48 and 50, used to position emitters, detectors or fiber terminations are located through the top surface 18.

Figure 7:
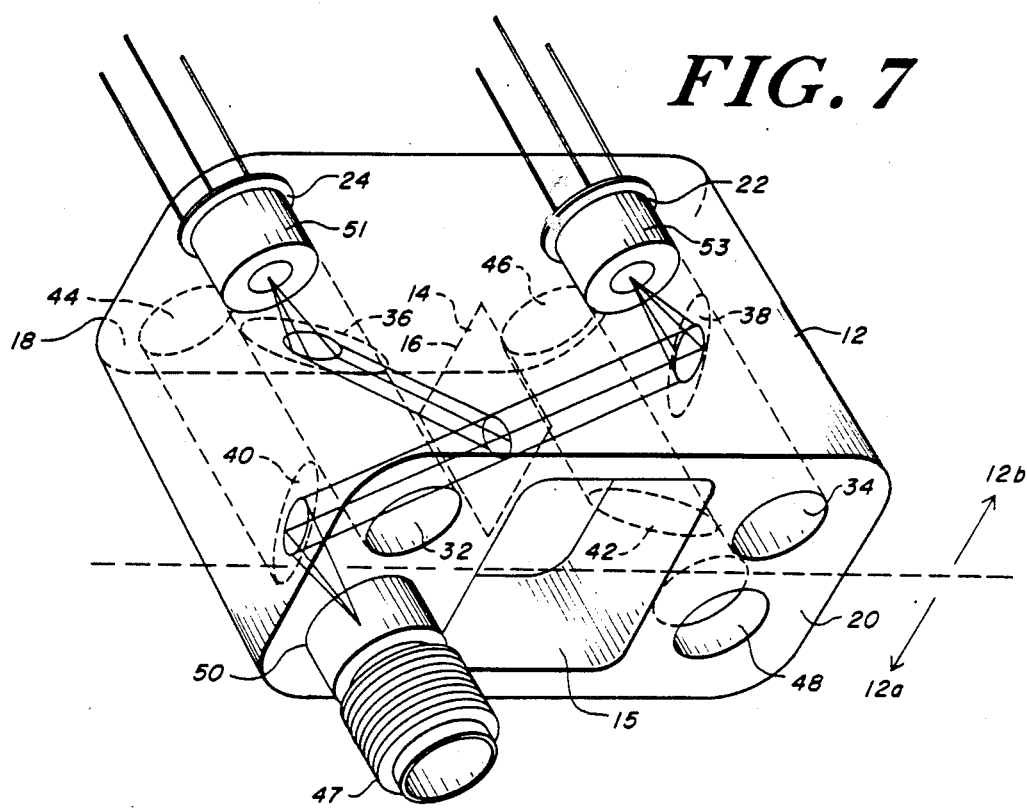
FIG. 7 is a pictorial perspective view of and through a generalized coupler according to the invention.

As shown in FIG. 7, a complete bidirectional coupling function is provided for radiation originating in the front half 12a of the body from a fiber in a connector adapter 47 fastened in cavity 50. This radiation is reflected by face 40 and passes through and/or is reflected from filter 16. In the case of reflected radiation it is then directed to a detector 51 in the cavity 24 after reflection by face 36 in cavity 32. An emitter 53 in cavity 22 emits radiation which is reflected by face 38 in cavity 34, is transmitted by filter 16 and is applied to the fiber in cavity 50 after reflection from face 40. The radiation paths for the coupler of FIG. 7 assumes paraboloidal faces 36, 38 and 40 producing a collimated radiation at the filter 16. In the case of ellipsoids for the faces the radiation is focused as it passes through or is reflected by the filter 16.

Figure 8:
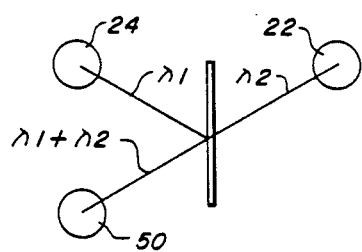
FIG. 8 is a diagrammatic view of a first application of the coupler of the present invention.

In FIG. 8, the coupler is shown in an application as a multiplexer or demultiplexer. In the case of a multiplexer, cavities 22 and 24 function to hold sources for two distinct colors one of which is transmitted and the other of which is reflected by the filter 16, typically a dichroic mirror, both being combined at the cavity 50 which can house a fiber in a connector or a detector. For use as a demultiplexer, cavity 50 functions to hold a source for the two frequencies which are separated by filter 16 toward receivers in respective cavities 22 and 24.

Figure 9:
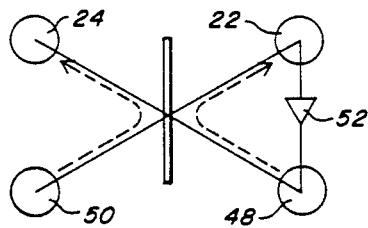
FIG. 9 is a diagrammatic view of a further application of the invention.

In the application of the coupler as a fail safe relay, shown in FIG. 9, the light from an input fiber located in cavity 50 is 50% transmitted by filter 16 to a detector in cavity 22 where it is sensed and amplified by an amplifier 52 and then applied to an emitter in the cavity 48, the light from which is 50% transmitted to an output fiber located in the cavity 24. Filter 16 also reflects 50% of the light from the emitter in cavity 50 directly into the fiber positioned in cavity 24 insuring that there will be some coupling into the output fiber in the event of failure of the electrical components.

In order to minimize polarizing effects at the filter, the angle formed by the radiation between the filter 16 and faces 36, 38, 40 and 42 with respect to the normal to the filter 16 is kept at or below twenty degrees.

Figure 10:
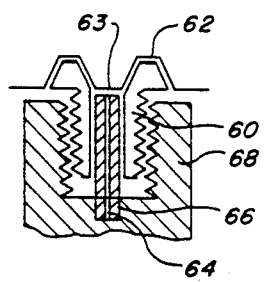
Figure 11:
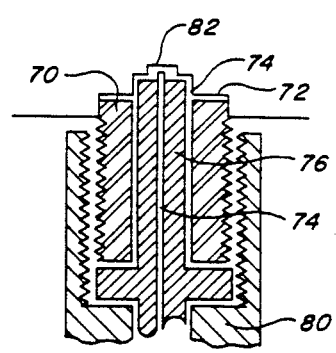

In order to locate an optical fiber in one of the source or receiver cavities 22, 24, 48 or 50, an adapted 47 can be fastened to the coupler as described above in order to accommodate an optical fiber connector. FIGS. 10 and 11 illustrate different forms for applying such an adapter. In FIG. 10, a threaded adapter 60 is welded by ultrasound into a recess 62 surrounding a surface 63 where a fiber 64, in a ferrule 66 of a connector 68, is brought into precise alignment. In FIG. 11, a threaded adapter 70 is fastened in a cavity 72 having a central positioning bore 74 for a ferrule 76 that holds a fiber 78 in a connector 70. Fiber 78 is thus brought into precise alignment on a surface 82 at the end of bore 74 for receiving or emitting light to the coupler. Cavity 48 of FIG. 3 is adapter for this type (SMA) of connector.

Figure 12:
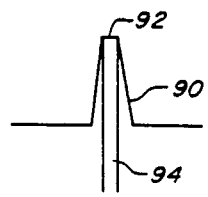
FIGS. 10, 11 and 12 are sectional views of a coupler body cavity adapted to receive a fiber or fiber connector.

A conical cavity 90 is shown in FIG. 12 adapted to function as a fiber pocket to align a fiber 94 as a source or receiver at a focus 92 of a reflective face. The fiber 94 is cemented or otherwise fastened in the cavity 90.

As can be seen from this description, an efficient and versatile coupler is provided using low cost molding techniques. Because the coupler uses plug-in or screw-in elements it is easily used in the field. In many applications, the presence of sets of source-receiver cavities will mean having a spare, should one become inoperative. While accuracy is required in the positioning of the coupler cavities, the absence of side actions will permit an accurate coupler to be made at reasonable cost.

The description above is of a preferred embodiment of the invention and is exemplary of its scope as defined in the following claims.

What is claimed is:

1. For use with a light source means for providing a light beam, means for receiving said light beam and an optical filter, an optical coupler comprising:
   an optically clear unitary coupler body having a plurality of recesses therein, said optical filter received by a first of said plurality of recesses, said light source means retained by a second of said plurality of recesses, and said means for receiving said light beam retained by a third of said plurality of recesses;
   means for reflecting said light beam formed from a surface of a fourth of said plurality of recesses, a first light path for said light beam is defined from said light source means to said beam receiving means by way of reflection from said fourth recess surface and passage through said first recess.

2. The optical coupler of claim 1, wherein
said fourth recess is positioned relative to at least one of said second and said third recess to provide optical alignment of said means for reflecting with at least one of said light source and said means for receiving.

3. The optical coupler of claim 1, wherein
the surface of said means for reflecting comprises one of an ellipsoid and a paraboloid surface.

4. The optical coupler of claim 1, further comprising
at least one of an additional light source and an additional means for receiving in alignment along a second light path joining said first light path, wherein, light transmission is provided through said optical filter and light transmission by reflection from said optical filter.

5. The optical coupler of claim 1, wherein said means for reflection provides total internal reflection within the material of said optically clear unitary coupler body.

6. The optical coupler of claim 5, wherein said light path is incident to said surface of said optical filter at an angle less than or equal to twenty degrees from normal.

7. The optical coupler of claim 1, wherein said optical filter comprises one of a dichromic and a beam-splitting mirror.

8. The optical coupler of claim 1, wherein said recesses are disposed on two surfaces of said optically clear unitary coupler body.

9. The optical coupler of claim 1, wherein said two surfaces are in confronting alignment.

10. The optical coupler of claim 1, wherein said surface of said means for reflection provides a collimated beam of light at said optical filter.

11. The optical coupler of claim 1, wherein said surface of said means for refleciton provides a focussed beam of light at said optical filter.

12. The optical coupler of claim 1, further including an additional means for reflection including a corresponding reflective surface also included within said light path, said surface of said additional means for reflection being formed from a fifth of said plurality of said recesses.

13. An optical fiber coupler comprising:
a unitary coupler body of transparent material having a first and a second surface disposed in opposition, and for providing an optical path therein, including:
means for receiving an optical filter in a selected position,
a first cavity in said first surface for retaining one of a light source and a means for receiving in a selected position,
a second cavity in said second surface for retaining the other of said light source and said means for receiving in a selected position,
a third cavity in said body, having a reflector surface corresponding to said first cavity in said first surface,
a fourth cavity in said body, having a reflector surface corresponding to said second cavity in said second surface, wherein
said optical path including in succession one of said light source and said means for receiving, said third cavity reflector surface, said optical filter receiving means, said fourth cavity reflector surface and the other of said light source and said means for receiving.

14. The optical fiber coupler of claim 13, wherein said surfaces of said third and said fourth reflector surfaces provide total internal reflection within said transparent material of said optically clear coupler body.

15. The optical fiber coupler of claim 13, having confronting molded surfaces, in which said cavities formed are all formed in said corresponding confronting surfaces.

16. The optical fiber coupler of claim 13, wherein said light path is at an angle of less than or equal to 20 degrees relative to normal.

17. The optical fiber coupler of claim 13, wherein said reflector surfaces of said third and said fourth cavities are planar.

* * * * *